Figure 1:
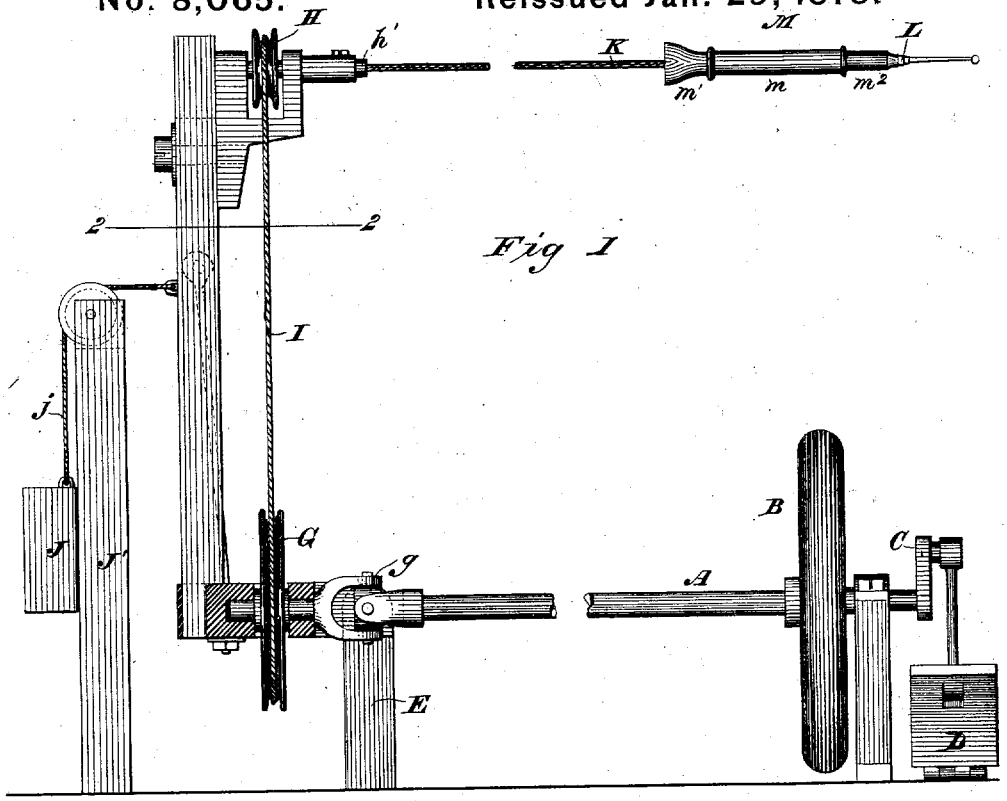

C. POOR. 2 Sheets—Sheet 1.

Assignor to S. S. WHITE.

Dental-Drill.

No. 8,065. Reissued Jan. 29, 1878.

WITNESSES

Wm. A. Skinkle

Geo. H. Buck

INVENTOR

Chandler Poor

By his Attorneys

Baldwin, Hopkins & Peyton

N. PETERS, PHOTO-LITHOGRAPHER, WASHINGTON, D. C.

C. POOR.

Assignor to S. S. WHITE.

Dental-Drill.

No. 8,065. Reissued Jan. 29, 1878.

WITNESSES

Wm A. Skinkle.

Geo W Brock.

INVENTOR

Chandler Poor.

By his Attorneys

Baldwin, Hopkins & Peyton

N. PETERS, PHOTO-LITHOGRAPHER, WASHINGTON, D. C.

UNITED STATES PATENT OFFICE.

CHANDLER POOR, OF DUBUQUE, IOWA, ASSIGNOR TO SAMUEL S. WHITE, OF PHILADELPHIA, PENNSYLVANIA.

IMPROVEMENT IN DENTAL DRILLS.

Specification forming part of Letters Patent No. 118,268, dated August 22, 1871; Reissue No. 8,065, dated January 29, 1878; application filed December 27, 1877.

*To all whom it may concern:*

Be it known that I, CHANDLER POOR, of the city and county of Dubuque, in the State of Iowa, have invented certain new and useful Improvements in Dental Engines and in Hand-Pieces therefor, of which the following is a specification:

My invention relates to a new and improved engine more especially designed to assist in operations performed by dentists upon natural teeth in the mouth, and particularly to that class of dental engines in which the operating-tool is connected with the driving-power through the medium of a rocking standard, provided with a counter-balance, in order to facilitate variations in the position of the operating-tool.

The object of the first part of my invention is to render the rocking arm capable of vibrating freely without affecting the prime mover, without varying the relation of the driving-pulley thereto, and without variations in the length of the driving-belt; to which ends my invention consists in a dental engine composed of a base or support, a rocking arm or frame pivoted upon the base, a counter-balance acting on the rocking arm, a driving-pulley mounted upon and vibrating with the rocking arm, a driven pulley, also mounted upon and vibrating with said arm, belt-connection between the pulleys, a flexible power-conveyer connected with the driven pulley, a rotary tool-chuck or mandrel driven thereby, and a prime mover to impart motion to the driving-pulley, without interfering with its rocking movements, in a plane at right angles to that in which the driving-pulley turns.

The object of the next part of my invention is more particularly to adapt the invention to the use of a foot-treadle as a prime mover; to which end my invention consists of the combination, in a dental engine, of a base or support, a rocking arm or frame pivoted thereon, carrying driving mechanism vibrating therewith, a counter-balance acting on the rocking arm to retain it normally in an upright position while allowing it a certain degree of flexure in one direction, and a foot-treadle imparting motion to a driving-shaft connected with the shaft of the driving-pulley by a universal joint in the axis of vibration of the rocking arm, whereby the free vibration of the rocking arm and driving mechanism carried thereby in a plane at right angles to that in which the driving-pulley turns is unimpeded.

The next part of my invention relates more especially to the hand-piece of the engine. Its object is to allow the mandrel or chuck mounted therein to rotate freely in its bearings, while prevented from wabbling, unsteadiness, or endwise movement, which ends I attain by reducing the diameter of the bore of the hand-piece casing at each end, to constitute journal-bearings for the reduced ends of the mandrel or chuck, the front end of said chuck being provided with a socket for the reception of the shank of the operating-tool, and its rear end being adapted for connection with the driving-power.

My invention further consists in a dental-engine hand-piece provided at its front end with a bearing for the front end of a mandrel or chuck mounted therein, and at its rear end with a bearing or sleeve for the rear end thereof, said rear bearing being removable for the purpose of allowing the withdrawal of the chuck from the casing without necessitating its disconnection from the driving-power; but when properly adjusted against the chuck all wabbling, unsteadiness, and endwise movement of the chuck in the casing are prevented without impeding its free rotation.

My invention further consists in the combination, in a dental-engine hand-piece, of a casing having a removable bearing to permit of the withdrawal of the chuck, a rotary chuck enveloped by said casing, and prevented from endwise movement therein by bearings at each end of the casing, and a tool-locking device carried by the chuck to lock the tool-shank in its socket, access being had to the tool-locking device through an aperture or opening in the casing, in line with which opening the lock is always brought to permit of its manipulation, owing to the prevention of endwise movement of the chuck in the hand-piece.

My invention further consists of a hand-piece enveloping a rotating chuck provided at its forward end with a socket and tool-lock, the hand-piece turning freely upon the chuck without impeding its rotation, in combination with flexible driving mechanism imparting motion to the chuck from the rear, whereby the hand-piece is given a wide range of movement in various directions, is capable of turning freely to conform to the movements of the hand of the operator, and is adapted for the ready interchange of operating-tools.

Figure 2:
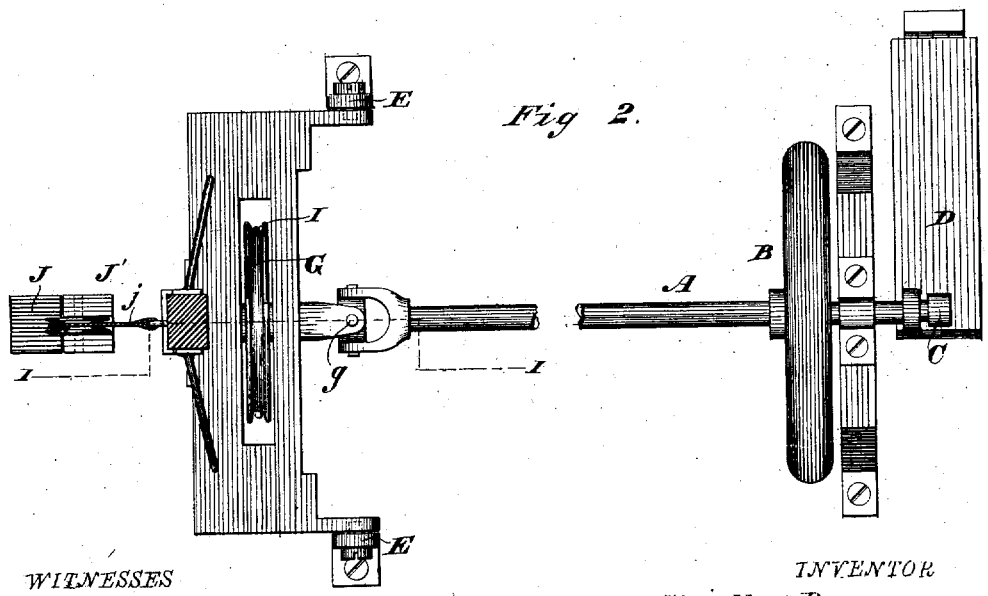
Figure 3:
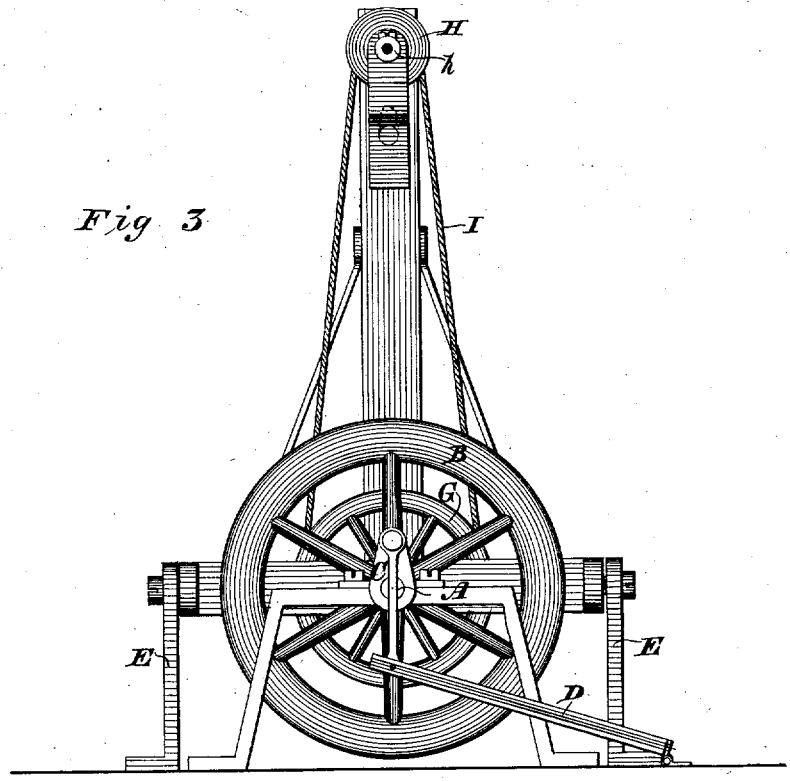

In the accompanying drawings, which show the best way now known to me of embodying my improvements, Figure 1 represents a side elevation of my improved apparatus, partly in section on the line 1 1 of Fig. 2; Fig. 2, a top or plan view thereof, partly in section on the line 2 2 of Fig. 1; Fig. 3, a front elevation with the flexible driving-shaft removed; and Fig. 4, a longitudinal central section of the hand-piece casing, the front end of the tool-chuck being also in section to show the manner of locking the shank of the operating-tool therein.

A driving-shaft, A, provided with a balance-wheel, B, is connected by a crank, C, with a foot-treadle, D. The driving-shaft is mounted in suitable bearings, and extends from the back of the operating-chair, where I prefer to locate the treadle, to the front of the chair, where I prefer to locate the rocking arm or frame, which vibrates on pivots upon a suitable base or standard, E, and is provided at its lower end with a driving-pulley, G, and at its upper end with a smaller pulley, H, the two pulleys being of any proper relative size, and connected together by a driving-belt, I. The driving-shaft, to which motion is imparted by the treadle, is connected with the shaft of the pulley G by a universal joint, *g*, by which means, in the organization shown, the free vibration of the rocking arm is permitted without interfering with the operation of the treadle.

It will be observed that the universal joint *g* is in the same axial plane as the pivots of the rocking arm, and that the rocking arm and the driving-pulley mounted therein vibrate concentrically with, but at right angles to, said pivots, so that the entire driving mechanism partakes of the movements of the rocking arm, instead of the driving-pulley being mounted on the pivot on which the rocking arm vibrates, as has heretofore been done.

To keep the rocking arm in a normally vertical or upright position, I provide it with a counter-balance, consisting, in the present instance, of a weight, J, suspended by a cord, *j*, passing from the back of the frame over a pulley mounted in an upright, J′.

The driven shaft *h* of the upper pulley H is extended from the face of the frame, and to it is connected one end of a flexible power-conveyer, K, composed, in the present instance, of a catgut rope, the outer or free end of which is connected with the inner end of a mandrel or chuck, L, mounted in a hand-piece, M, and imparts rotary motion to the chuck.

By this mode of construction and arrangement the power necessary to drive the engine is imparted by the foot of the operator to the treadle, from whence it is communicated, through the driving mechanism mounted on the rocking arm or frame, to the flexible shaft, and from thence to the tool-chuck mounted in the hand-piece. Owing to the flexibility of the power-conveyer K, the hand-piece carrying the operating-tool is free to be moved in all directions within its length without interrupting the transmission of the driving-power, and, as the engine frame or standard is capable of vibrating on its pivots, any excess of movement desired by the operator for the hand-piece beyond that afforded by the length of the shaft can be obtained by pulling upon the hand-piece to rock the frame, which frame, when released, is immediately returned to its normal or upright position by the counter-balance.

Figure 4:
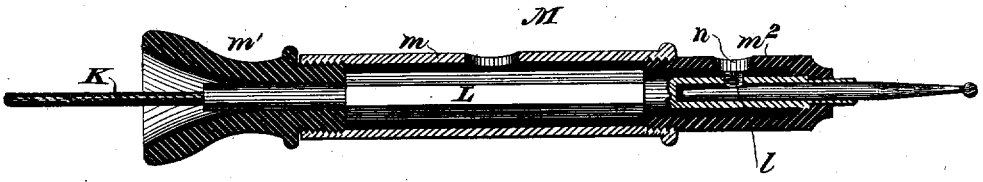

I will now describe in detail the construction of the hand-piece of the engine, referring particularly to Fig. 4 of the drawings.

The casing is, by preference, composed of a main portion, *m*, and end pieces or sleeves $m^1$ $m^2$, which end pieces constitute the bearings for the mandrel or chuck L, provided at its front end with a socket, and connected at its rear with the driving-shaft K in a well-known way. The end pieces are removable from, and adjustable in, the main portion of the casing, and their bores are of smaller diameter than that of the said main portion for the reception of the reduced ends of the chuck, the body or larger portion of which fits within the main portion *m*, and is adapted to turn freely therein without coming in contact with its sides, the chuck being supported entirely by its reduced ends or journals.

The shoulders formed on the chuck by reducing its ends abut against shoulders formed by reducing the bore of the casing, and the chuck is thereby prevented from unsteady and endwise movement when the bearings are properly adjusted, and, consequently, the operating-tool carried by the chuck runs true and firm, which is a great advantage, owing to the delicacy of the work to be performed. There is also less friction between the chuck and enveloping-casing when constructed with journal-bearings at front and rear than when the entire chuck is in contact with the sides of the casing.

By making the rear bearing or sleeve removable, the chuck can be drawn out endwise from the casing, when that is desirable or necessary, without necessitating its disconnection from the driving-shaft, and, when properly adjusted, said bearing will lock the chuck against endwise movement.

Another advantage attained by my invention is the capacity possessed by the casing of turning upon the chuck without interrupting its free rotation therein, by which means the hand-piece, while free to be moved in various directions by the flexure of the driving mechanism, is also capable of swiveling freely to conform to the turning movements of the operator's hand.

The operating tools are securely locked in the socket of the chuck by means of a locking-pin or set-screw, *l*, carried by and revolving with the chuck, which lock works in an aperture or hole formed in the forward end of the chuck, at right angles to and opening into the socket. The end of the lock comes in contact with and bears firmly against the side of the tool-shank, which is, preferably, provided with a flat surface, and securely locks it in place, preventing either longitudinal or rotary movement of the tool independent of the chuck.

The locking device will necessarily have to be removed or disengaged from the tool-shank before the latter can be removed from the chuck, and, as the locking device is enveloped by the surrounding casing, it would be necessary, if other means of access were not provided, to withdraw the chuck from the casing to manipulate the lock. To obviate this objection I form an opening or aperture, *n*, in the casing, through which access is had to the tool-lock to manipulate it, and, as the chuck is prevented from endwise movement, the lock is always in line with the opening.

I am aware that it is not new, and I do not broadly claim locking a tool in a rotary socket through openings in an enveloping-casing. This method of locking has heretofore been attempted; but the chuck carrying the lock is not positively secured against endwise movement, and the construction is such that only tools with very long shanks can be used, the tool-lock, chuck, and openings being located at the rear of the hand-piece.

I am also aware that a hand-piece having removable sections, with a rotating chuck or tool-holder mounted in one of said removable sections and driven by a flexible shaft, is shown in Letters Patent No. 118,237, granted to Alexander Hartman, August 22, 1871, and do not, therefore, broadly claim anything shown in said patent. I hereby expressly concede to Hartman priority of invention of the devices shown in his said patent.

I claim as my invention—

1. A dental engine constructed substantially as hereinbefore set forth, composed of the following elements, to wit: a base or support, a rocking arm or frame pivoted upon the base, a counter-balance acting on the rocking arm, a driving-pulley mounted upon and vibrating with the rocking arm in a plane at right angles to that in which the driving-pulley turns, a driven pulley, also mounted upon and vibrating with said arm, belt-connections between the pulleys, a flexible power-conveyer connected with the driven pulley, a rotary tool-chuck or mandrel driven thereby, and a prime mover to impart motion to the driving-pulley without interfering with its rocking movements.

2. The combination, in a dental engine, of a base or support, a rocking arm or frame pivoted thereon, carrying driving mechanism vibrating therewith in a plane at right angles to that in which the driving-pulley turns, a counter-balance acting on the rocking arm to retain it normally in an upright position while allowing it a certain degree of flexure in one direction, and a foot-treadle imparting motion to a driving-shaft connected with the shaft of the driving-pulley by a universal joint in the axis of vibration of the rocking arm, as set forth.

3. A dental-engine sectional hand-piece constructed substantially as hereinbefore set forth, with the diameter of its bore reduced at each end to constitute journal-bearings for the reduced ends of a rotating chuck or mandrel, having its front end provided with a socket for the reception of the shank of an operating-tool, and its rear end adapted for connection with the driving power.

4. A dental-engine hand-piece constructed substantially as hereinbefore set forth, provided at its front end with a bearing for the front end of a rotary chuck mounted therein, and at its rear end with a removable bearing or sleeve for the rear end of the chuck, whereby the said rear bearing, when properly adjusted, prevents unsteady working and endwise movement of the chuck in the casing, but when removed permits of the withdrawal of the chuck without necessitating its disconnection from the driving-shaft.

5. The combination, substantially as hereinbefore set forth, in a dental-engine hand-piece, of a casing having a removable bearing to permit of the withdrawal of the chuck, a rotary chuck enveloped by said casing, and prevented from endwise movement therein by bearings at each end of the casing, and a tool-locking device carried by the chuck, to lock the tool-shank in the socket, access being had to the tool-locking device through an aperture or opening in the casing, in line with which opening the lock is always brought to permit of its manipulation, owing to the prevention of endwise movement of the chuck in the hand-piece.

6. The combination, substantially as hereinbefore set forth, of a hand-piece enveloping a rotary chuck locked against endwise movement, and provided at its forward end with a socket and tool-lock, the hand-piece turning freely upon the chuck without impeding its rotation, with flexible driving mechanism imparting motion to the chuck from the rear, whereby the hand-piece is given a wide range of movement in various directions, is capable of turning freely to conform to the movements of the hand of the operator, and is adapted for the ready interchange of operating-tools.

CHANDLER POOR.

Witnesses:
W. S. WRIGHT,
M. A. SMITH.